United States Patent
Lu et al.

(10) Patent No.: US 11,068,080 B2
(45) Date of Patent: Jul. 20, 2021

(54) MOUSE DEVICE AND SCROLL WHEEL MODULE

(71) Applicants: DEXIN ELECTRONIC LTD., Guangdong (CN); DEXIN CORPORATION, New Taipei (TW)

(72) Inventors: Ho-Lung Lu, New Taipei (TW); Chin-Lung Lin, New Taipei (TW)

(73) Assignees: DEXIN ELECTRONIC LTD., Guangdong (CN); DEXIN CORPORATION, New Taipei (TW)

( * ) Notice: Subject to any disclaimer, the term of this patent is extended or adjusted under 35 U.S.C. 154(b) by 0 days.

(21) Appl. No.: 16/917,910

(22) Filed: Jul. 1, 2020

(65) Prior Publication Data

US 2021/0117016 A1 Apr. 22, 2021

(30) Foreign Application Priority Data

Oct. 21, 2019 (TW) ................................ 108137870

(51) Int. Cl.
*G06F 3/0354* (2013.01)
*G06F 3/0485* (2013.01)
*G06F 3/03* (2006.01)
*G06F 3/0362* (2013.01)

(52) U.S. Cl.
CPC ........ *G06F 3/03543* (2013.01); *G06F 3/0312* (2013.01); *G06F 3/0362* (2013.01); *G06F 3/0485* (2013.01)

(58) Field of Classification Search
None
See application file for complete search history.

(56) References Cited

U.S. PATENT DOCUMENTS

| | | | | |
|---|---|---|---|---|
| 6,188,393 B1* | 2/2001 | Shu | .................... | G06F 3/0312 345/163 |
| 6,353,429 B1* | 3/2002 | Long | .................. | G01D 5/34738 345/158 |
| 6,411,279 B1* | 6/2002 | Tseng | .................... | G06F 3/0312 345/163 |
| 2013/0027308 A1* | 1/2013 | Peng | .................. | G06F 3/03543 345/163 |
| 2016/0041633 A1* | 2/2016 | Weng | .................. | G06F 3/03543 345/163 |

\* cited by examiner

*Primary Examiner* — Amare Mengistu
*Assistant Examiner* — Sarvesh J Nadkarni
(74) *Attorney, Agent, or Firm* — Li & Cai Intellectual Property Office

(57) ABSTRACT

A mouse device includes a scroll wheel module. The scroll wheel module includes a long shaft, a scroll wheel, an encoding wheel, and a switching unit. The scroll wheel and the encoding wheel are disposed on two sides of the long shaft. The encoding wheel includes a first encoding groove module and a second encoding groove module. The switching unit includes a first switch and a second switch. The first switch engages with the first encoding groove module. The second switch engages with the second encoding groove module. The first encoding groove module includes a plurality of first encoding grooves. A quantity of the first encoding grooves is a first number. The second encoding groove module includes a plurality of second encoding grooves. A quantity of the second encoding grooves is a second number.

11 Claims, 7 Drawing Sheets

MOUSE DEVICE AND SCROLL WHEEL MODULE

CROSS-REFERENCE TO RELATED PATENT APPLICATION

This application claims the benefit of priority to Taiwan Patent Application No. 108137870, filed on Oct. 21, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a mouse device a scroll wheel module, and more particularly to a mouse device a scroll wheel module having multiple modes.

BACKGROUND OF THE DISCLOSURE

At present, by pressing down on a scroll wheel of a mouse device, the scroll wheel can be switched between different modes. However, the design of a scroll wheel is complicated, and a cost thereof is high.

Therefore, it is an important subject in the industry to provide a mouse device having different scroll wheel modes with a simple design and a lower cost.

SUMMARY OF THE DISCLOSURE

In response to the above-referenced technical inadequacies, the present disclosure provides a mouse device. The mouse device includes a scroll wheel module. The scroll wheel module includes a long shaft, a scroll wheel, an encoding wheel, and a switching unit. The scroll wheel and the encoding wheel are disposed on two sides of the long shaft. The encoding wheel includes a first encoding groove module and a second encoding groove module. The switching unit includes a first switch and a second switch. The first switch engages with the first encoding groove module. The second switch engages with the second encoding groove module, the first encoding groove module including a first number of first encoding grooves, the first number of the first encoding grooves being more than one, the second encoding groove module including a second number of second encoding grooves, the second number of the second encoding grooves being more than one.

In one aspect, the present disclosure provides a scroll wheel module. The scroll wheel module is disposed in a mouse device. The scroll wheel module includes a scroll wheel, a long shaft, an encoding wheel, and a switching unit. The scroll wheel is disposed on one side of the long shaft. The encoding wheel is disposed on another side of the long shaft. The scroll wheel and the encoding wheel have a predetermined distance therebetween. The encoding wheel includes a first encoding groove module and a second encoding groove module. The first encoding groove module is adjacent to the second encoding groove module. The first encoding groove module includes a plurality of first encoding grooves. The second encoding groove module includes a plurality of second encoding grooves. A quantity of the first encoding grooves is not equal to a quantity of the second encoding grooves. The switching unit includes a first switch and a second switch. The first switch is configured to engage with the first encoding grooves of the first encoding groove module. The second switch being configured to engage with the second encoding grooves of the second encoding groove module.

In another aspect, the present disclosure provides a mouse device. The mouse device includes a scroll wheel module and a bracket module. The scroll wheel module includes a long shaft, a scroll wheel, an encoding wheel, and a switching unit. The encoding wheel includes at least two encoding groove modules. The at least two encoding groove modules are adjacently disposed. The encoding wheel and the scroll wheel are disposed on two sides of the long shaft. The encoding wheel and the scroll wheel have a distance therebetween. The switching unit includes at least two switches. The at least two switches respectively are configured to engage with the at least two encoding groove modules. The scroll wheel module is disposed on the bracket module. The scroll wheel module and the bracket module are disposed in the mouse device. The at least two switches respectively engage with the at least two encoding groove modules based on the different states of the switching unit. The mouse device provides at least two types of wheel control signals corresponding to at least two modes of the scroll wheel module.

In conclusion, the scroll wheel module of the present disclosure uses the encoding wheel to provide wheel control signals of various modes, is simple in design and assembly, and has a reduced manufacturing cost.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
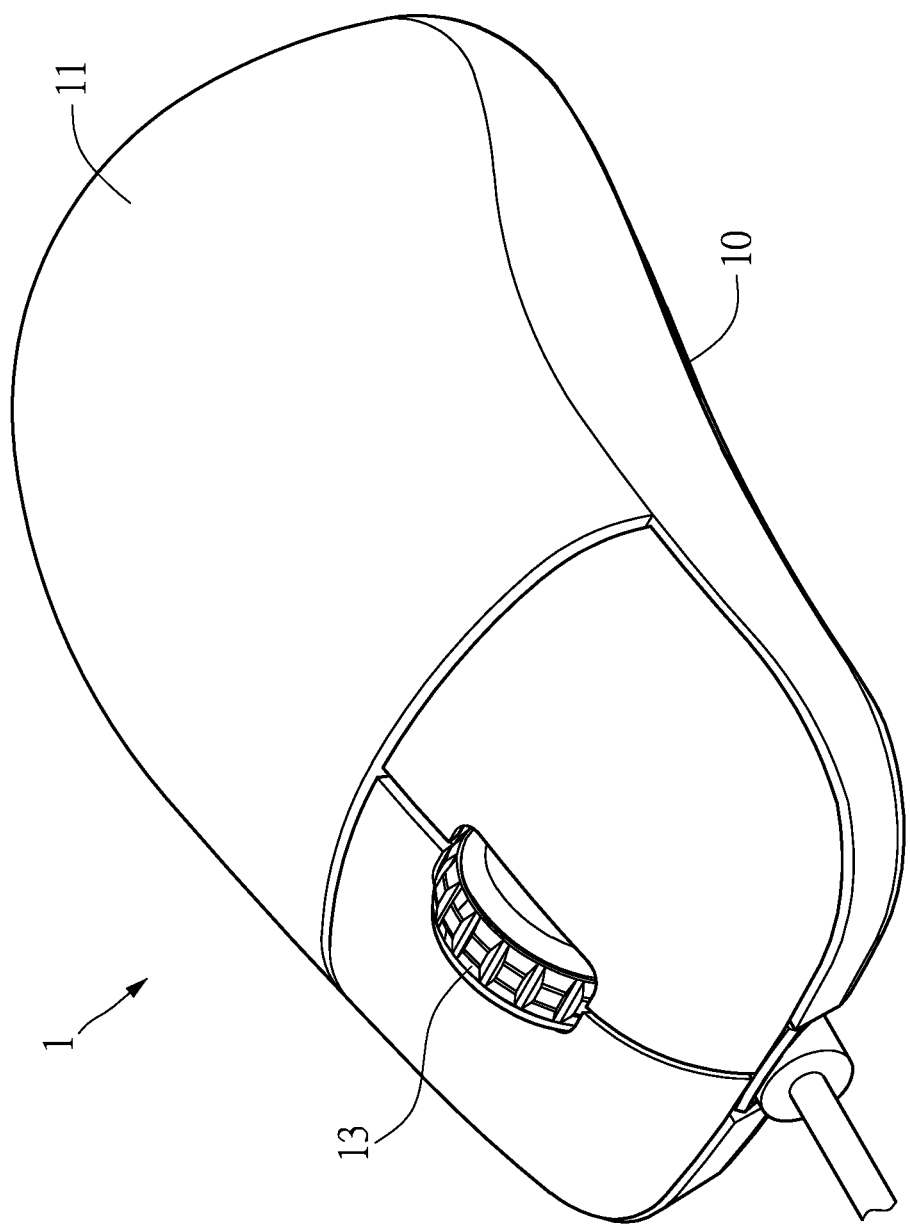
FIG. 1 is a schematic view of a mouse device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
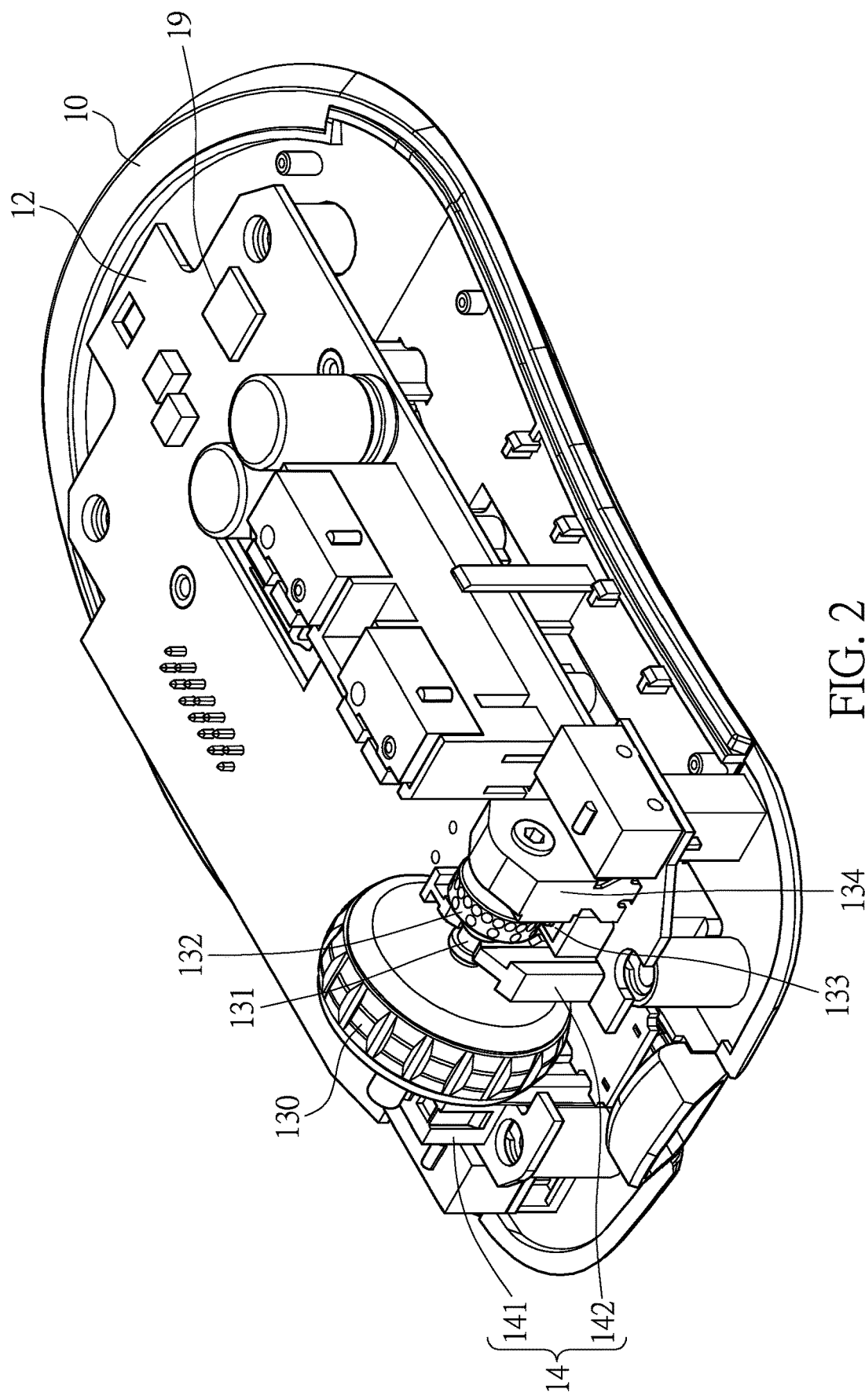
FIG. 2 is a schematic view of a scroll wheel module, a lower case, and a printed circuit board according to the embodiment the present disclosure.
Figure 3:
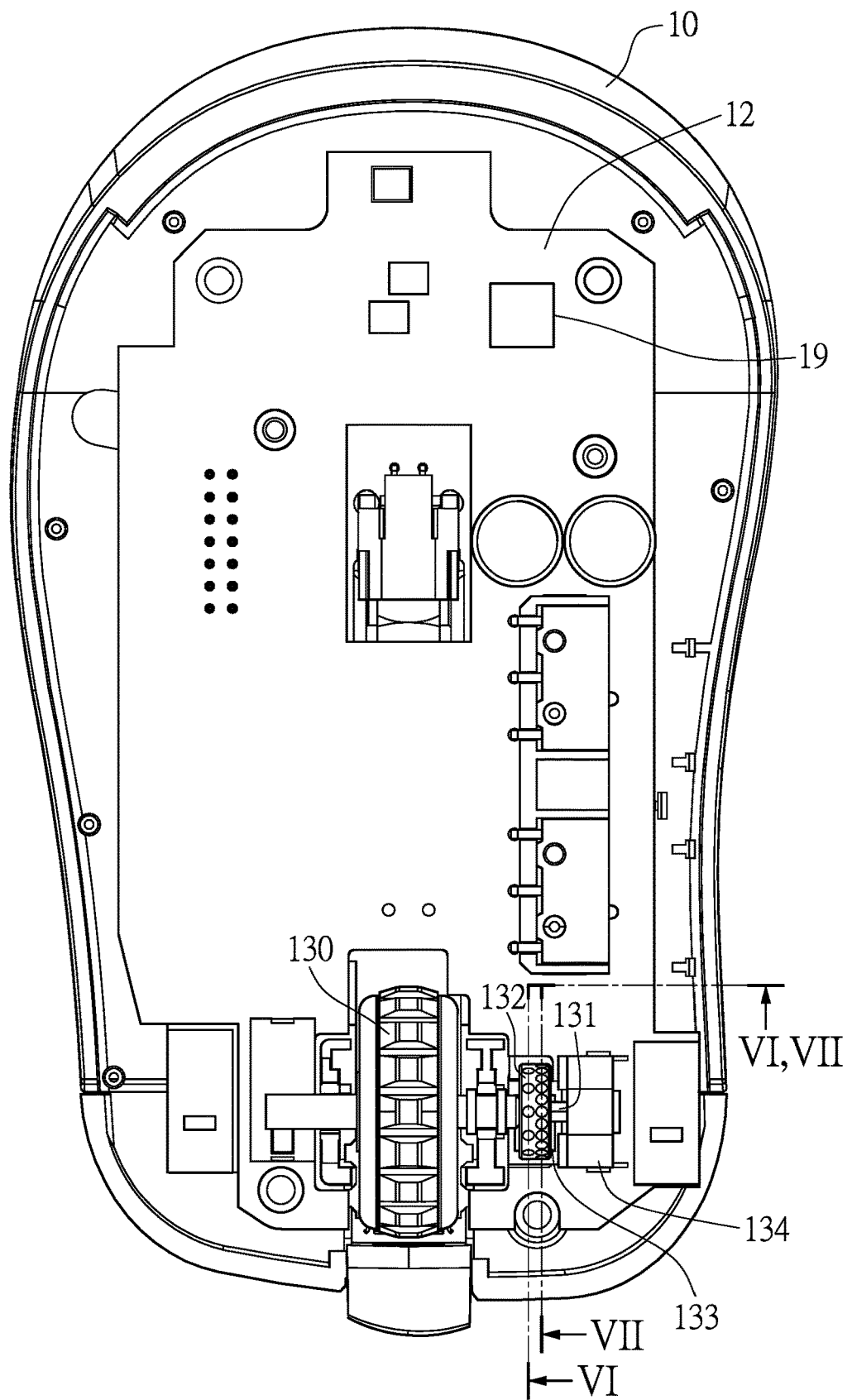
FIG. 3 is a top view of the scroll wheel module, the lower case and the printed circuit board according to the embodiment of the present disclosure.
Figure 4:
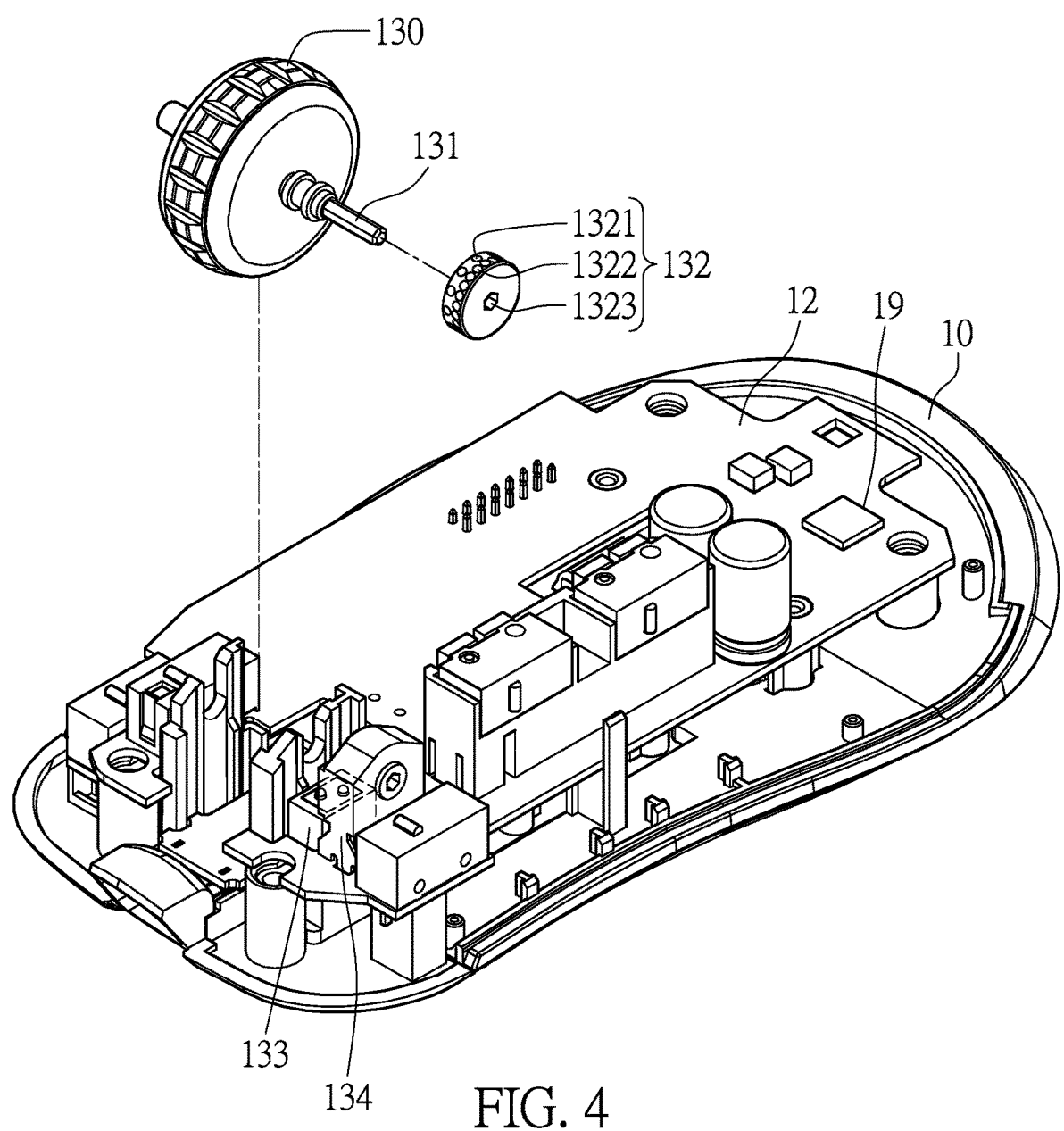
FIG. 4 is an exploded view of the scroll wheel module and the lower cover according to the embodiment of the present disclosure.
Figure 5:
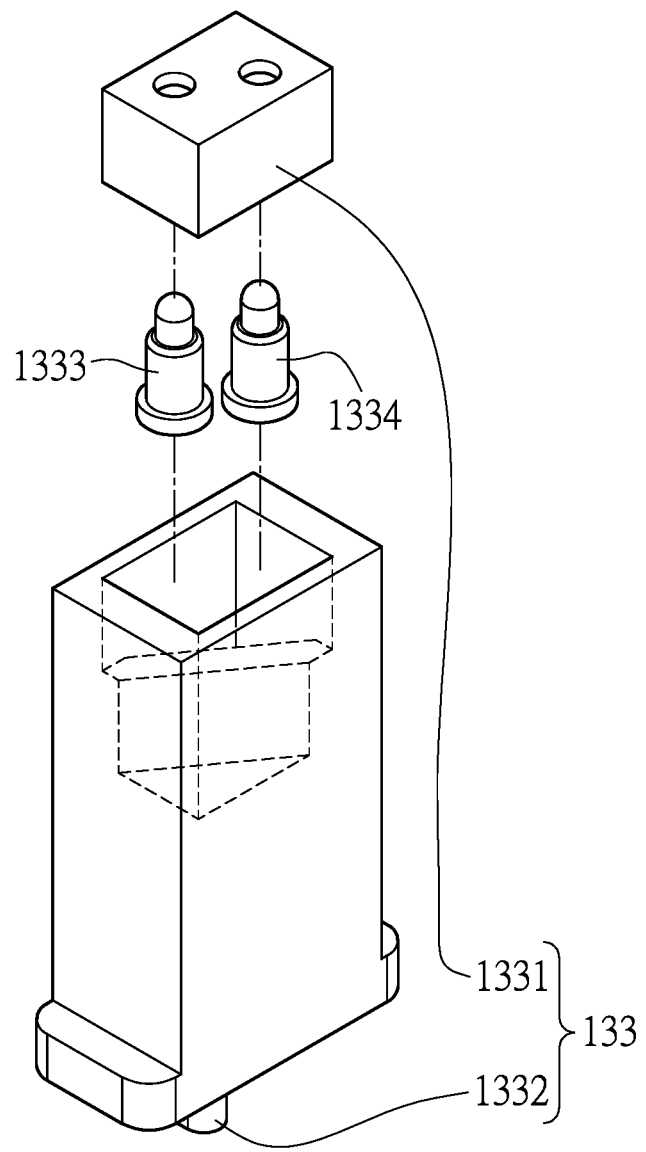
FIG. 5 is a schematic view of a switching unit according to the embodiment of the present disclosure.
Figure 6:
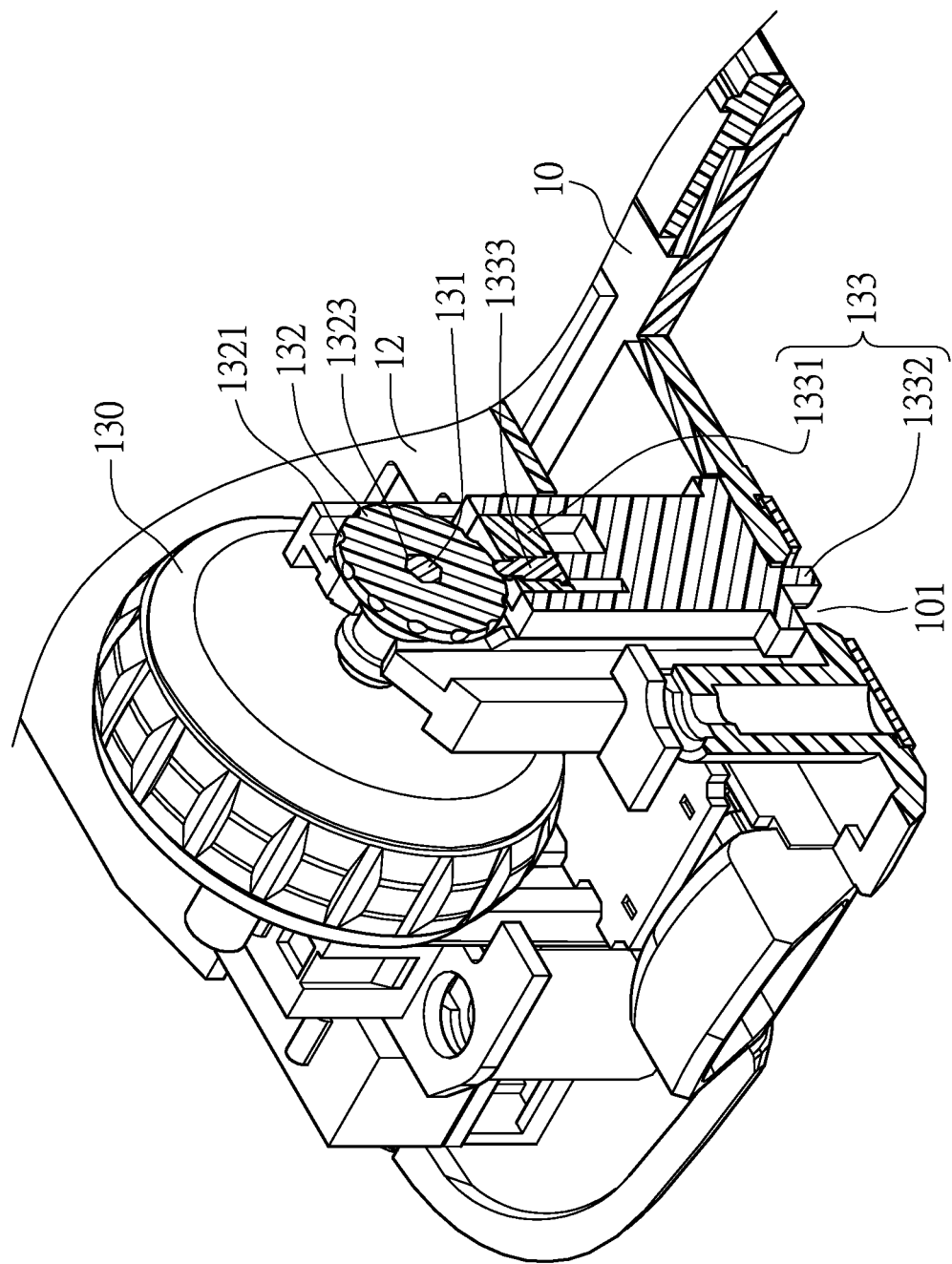
FIG. 6 is a cross-sectional view taken along line VI-VI of the scroll wheel module in FIG. 3 of the present disclosure.
Figure 7:
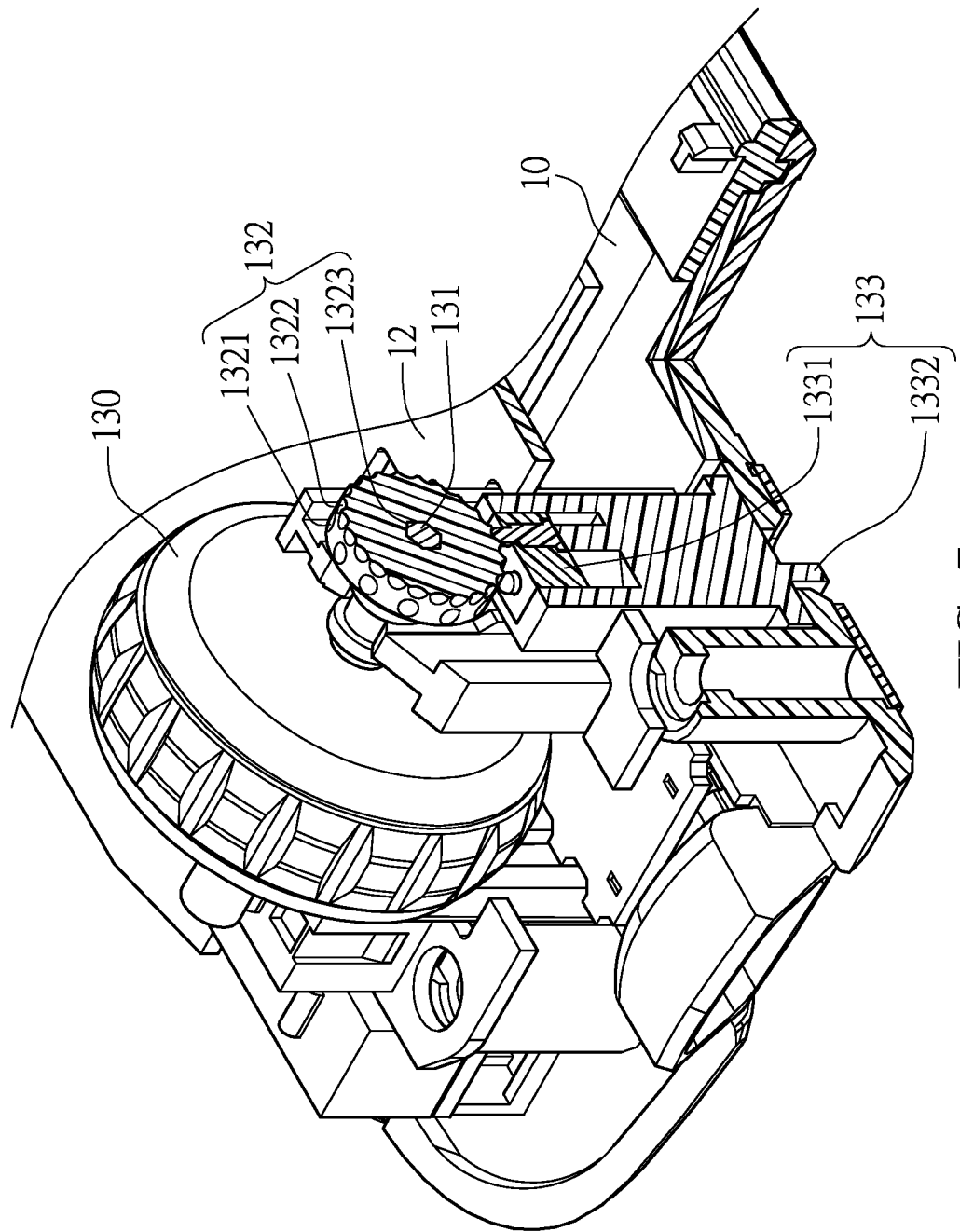
FIG. 7 is a cross-sectional view taken along line VII-VII of the scroll wheel module in FIG. 3 of the present disclosure.

Referring to FIG. 1, FIG. 2, FIG. 3, FIG. 4, FIG. 5, FIG. 6, and FIG. 7, FIG. 1 is a schematic view of a mouse device according to an embodiment of the present disclosure. FIG. 2 is a schematic view of a scroll wheel module, a lower case, and a printed circuit board of according to the embodiment the present disclosure. FIG. 3 is a top view of the scroll wheel module, the lower case and the printed circuit board according to the embodiment of the present disclosure. FIG. 4 is an exploded view of the scroll wheel module and the lower cover according to the embodiment of the present disclosure. FIG. 5 is a schematic view of a switching unit according to the embodiment of the present disclosure. FIG. 6 is a cross-sectional view taken along the section line VI-VI of the scroll wheel module in FIG. 3 of the present disclosure. FIG. 7 is a cross-sectional view taken along the section line VII-VII of the scroll wheel module in FIG. 3 of the present disclosure.

A mouse device 1 includes an upper case 11 and a lower case 10. The upper case 11 is disposed on the lower case 11. The upper case 11 and the lower case 10 have an accommodation space therebetween to accommodate other components. The mouse device 1 further includes a processor 19 and a printed circuit board 12. The processor 19 is disposed on the printed circuit board 12. The printed circuit board 12 is disposed on the lower case 10.

The mouse device 1 further includes a scroll wheel module 13 and a bracket module 14. The scroll wheel module 13 includes a roller 130, a long shaft 131, an encoding wheel 132, and a switching unit 133.

The roller 130 and the encoding wheel 132 are respectively disposed on two sides of the long shaft 131. In other words, the roller 130 has a hole (not shown) for accommodating the long shaft 131, and the roller 130 is disposed on one side of the long shaft 131. The encoding wheel 132 also has a hole 1323 to accommodate the long shaft 131, and the encoding wheel 132 is disposed on the other side of the long shaft 131. The encoding wheel 132 is opposite to the roller 130.

The encoding wheel 132 includes a first encoding groove module 1321 and a second encoding groove module 1322.

Referring to FIG. 5, the switching unit 133 includes a first switch 1333 and a second switch 1334. The first switch 1333 is configured to engage with the first encoding groove module 1321. The second switch 1334 is configured to engage with the second encoding groove module 1322. The first encoding groove module 1321 includes a plurality of first encoding grooves (not shown). A quantity of the first encoding grooves is a first number. The second encoding groove module 1322 includes a plurality of second encoding grooves (not shown). A quantity of the second encoding grooves (not shown) is a second number. The first number is not equal to the second number. In the embodiment, the first encoding groove module 1321 includes 12 first encoding grooves (not shown). The second encoding groove module 1322 includes 24 second encoding grooves (not shown). In other embodiments, the first number and the second number can be adjusted based on actual requirements, and are limited in the present disclosure. The first encoding groove module 1321 and the second encoding groove module 1322 are adjacently disposed on the encoding wheel 132.

The first switch 1333 and the second switch 1334 are respectively protruding units. When the encoding wheel 132 rotates with the roller 130, the first switch 1333 can engage with the first encoding grooves (not shown) of the first encoding groove module 1321, and the second switch 1334 can engage with the second encoding grooves (not shown) of the second encoding groove module 1322. In the embodiment, the switching unit 133 is disposed below the encoding wheel 132. In addition, the switching unit 133 further includes a housing 1331 and a switch 1332. The housing 1331 accommodates the first switch 1333 and the second switch 1334.

The switch 1332 is disposed below the housing 1331. Different positions of the switch 1332 determine whether the first switch 1333 or the second switch 1334 protrudes from the housing 1331 to engage with the first encoding groove module 1321 or the second encoding groove module 1322, respectively. The first encoding grooves (not shown) and the second encoding grooves (not shown) are hemispherical grooves, respectively.

In the embodiment, the wheel module 13 is disposed on the bracket module 14. The wheel module 13 and the bracket module 14 are disposed in the mouse device 1.

Referring to FIG. 2, the bracket module 14 includes a first bracket 141 and a second bracket 142. The first bracket 141 is disposed on one side of the roller 130. The second bracket 142 is disposed between the roller 130 and the encoding wheel 132. In other words, the long shaft 131 is disposed on the first bracket 141 and the second bracket 142.

Referring to FIG. 6 and FIG. 7, the switching unit 133 includes a first state and a second state. In other words, the switch 1331 is disposed at the first position in FIG. 6 and the second position in FIG. 7.

When the switching unit 133 is in the first state, the first switch 1333 engages with the first encoding groove module 1321, the second switch 1334 does not engage with the second encoding groove module 1322, and the mouse device 1 provides a wheel control signal of a first mode to a computer device (not shown). A quantity of the first mode is equal to the first number. In other words, a rotation of the roller 130 is affected by the engagement of the first encoding groove module 1321 of the encoding wheel 132 and the first switch 1333.

When the switching unit 133 is in the second state, the first switch 1333 does not engage with the first encoding groove module 1321, the second switch 1334 engages with the second encoding groove module 1322, and the mouse device 1 provides a wheel control signal of a second mode to the computer device (not shown). A quantity of the second mode is equal to the second number. In other words, the rotation of the roller 130 is affected by the engagement of the second encoding groove module 1322 of the encoding wheel 132 and the second switch 1334.

In other embodiments, the switching unit 133 may further include a third state. In other words, when the switching unit 133 is in the third state, the first switch 1333 does not engage with the first encoding groove module 1321, and the second switch 1334 also does not engage with the second encoding groove module 1322. Therefore, the mouse device 1 provides a wheel control signal of a third mode to the computer device (not shown). In this case, a quantity of the third mode is 0. In other words, the roller 130 is not affected by any restrictions when the roller rotates. The encoding wheel 132 may further include two or more types of encoding groove modules, such as 3 or 4 types, but is not limited in the present disclosure.

In other words, in the embodiment, the two switches of the switching unit 133 engage with the two encoding groove modules of the encoding wheel 132 based on the different states of the switching unit 133. Therefore, the mouse device 1 can provide at least two types of wheel control signals of two modes based on settings of the wheel module 13.

In addition, a first opening is provided in the upper case 11 to accommodate the roller 130.

A second opening 101 is provided in the lower case 10 for accommodating a switch 1332 of the switching unit 133.

The wheel module 13 further includes a roller signal generator 134, and the roller signal generator 134 is electrically connected to the processor 19. The long shaft 131 is disposed in the roller signal generator 134. When the roller 130 rotates, the roller signal generator 134 provides a roller signal to the processor 19 based on an angular speed, an angle, and a direction of rotation of the roller. The processor 19 transmits a wheel control signal to the computer device (not shown) based on the roller signal.

In conclusion, the scroll wheel module of the present disclosure uses the encoding wheel to provide wheel control signals of various modes, is simple in design and assembly, and has a reduced manufacturing cost.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A mouse device comprising:
   a scroll wheel module including:
   a long shaft;
   a scroll wheel;
   an encoding wheel, the scroll wheel and the encoding wheel being disposed on two sides of the long shaft, the encoding wheel including a first encoding groove module and a second encoding groove module; and
   a switching unit including a first switch and a second switch, the first switch engaging with the first encoding groove module, the second switch engaging with the second encoding groove module, the first encoding groove module including a first number of first encoding grooves, the first number of the first encoding grooves being more than one, the second encoding groove module including a second number of second encoding grooves, the second number of the second encoding grooves being more than one;
   wherein, when the first switch engages with the first encoding groove module, the second switch does not engage with the second encoding groove module, and when the second switch engages with the second encoding groove module, the first switch does not engage with the first encoding groove module.

2. The mouse device of claim 1, further comprising a bracket module, the scroll wheel module being disposed on the bracket module, and the scroll wheel module and the bracket module being disposed in the mouse device.

3. The mouse device of claim 2, wherein the bracket module includes a first bracket and a second bracket, the first bracket being disposed at one side of the scroll wheel, and the second bracket being disposed between the scroll wheel and the encoding wheel.

4. The mouse device of claim 1, further comprising:
   an upper case having a first opening formed therein; and
   a lower case having a second opening formed therein for accommodating a switch of the switching unit, the upper case being disposed on the lower case, and the upper case and the lower case having an accommodating space for accommodating the scroll wheel module and the bracket module.

5. The mouse device of claim 1, further comprising:
   a processor disposed on a printed circuit board;
   wherein the scroll wheel module further includes a scroll wheel signal generator, the scroll wheel signal generator is electrically connected to the processor, and the long shaft is disposed in the scroll wheel signal generator;
   wherein when the scroll wheel rotates, the scroll wheel signal generator transmits a scroll wheel signal to the processor based on an angle speed, an angle, and a rotation direction of the scroll wheel, and the processor transmits a wheel control signal to a computer device based on the scroll wheel signal.

6. The mouse device of claim 1, wherein the switching unit is disposed below the encoding wheel.

7. The mouse device of claim 1, wherein the first encoding grooves and the second encoding grooves are hemispherical.

8. A scroll wheel module disposed in a mouse device, the scroll wheel module comprising:
   a scroll wheel;
   a long shaft, the scroll wheel being disposed on one side of the long shaft;
   an encoding wheel being disposed on another side of the long shaft, the scroll wheel and the encoding wheel having a predetermined distance therebetween, the encoding wheel including a first encoding groove module and a second encoding groove module, the first encoding groove module being adjacent to the second encoding groove module, the first encoding groove module including a plurality of first encoding grooves, the second encoding groove module including a plurality of second encoding grooves, and a quantity of the first encoding grooves being not equal to a quantity of the second encoding grooves; and a switching unit including a first switch and a second switch, the first switch being configured to engage with the first encoding grooves of the first encoding groove module, the second switch being configured to engage with the second encoding grooves of the second encoding groove module;

wherein, when the first switch engages with the first encoding groove module, the second switch does not engage with the second encoding groove module, and when the second switch engages with the second encoding groove module, the first switch does not engage with the first encoding groove module.

9. A mouse device comprising:

a scroll wheel module, the scroll wheel module including:
  a long shaft;
  a scroll wheel;
  an encoding wheel including at least two encoding groove modules, the at least two encoding groove modules being adjacently disposed, the encoding wheel and the scroll wheel being disposed on two sides of the long shaft, and the encoding wheel and the scroll wheel having a distance therebetween; and
  a switching unit including at least two switches, the at least two switches respectively being configured for engaging with the at least two encoding groove modules; and a bracket module, the scroll wheel module being disposed on the bracket module, the scroll wheel module and the bracket module being disposed in the mouse device;

wherein the at least two switches respectively engage with the at least two encoding groove modules based on the different states of the switching unit, the mouse device providing at least two types of wheel control signals corresponding to at least two modes of the scroll wheel module;

wherein, when one of the at least two switches engages with one of the at least two encoding groove modules, another one of the at least two switches does not engage with another one of the at least two encoding groove modules.

10. The mouse device of claim 9, wherein the switching unit includes a first state, a second state, and a third state, the switching unit includes a first switch and a second switch, the at least two encoding groove modules includes a first encoding groove module and a second encoding groove module, the first encoding groove module includes a plurality of first encoding grooves, a quantity of the first encoding grooves is a first number, the second encoding groove module includes a plurality of second encoding grooves, and a quantity of the second encoding grooves is a second number, wherein when the switching unit is in the first state, the first switch engages with the first encoding groove module, the second switch does not engage with the second encoding groove module, and the mouse device provides a wheel control signal of a first mode to a computer device, a quantity of the first mode being equal to the first number;

wherein when the switching unit is in the second state, the first switch does not engage with the first encoding groove module, the second switch engages with the second encoding groove module, and the mouse device provides a wheel control signal of a second mode to a computer device, a quantity of the second mode being equal to the second number;

wherein when the switching unit is in the third state, the first switch does not engage with the first encoding groove module, the second switch does not engage with the second encoding groove module, and the mouse device provides a wheel control signal of a third mode to a computer device.

11. The mouse device of claim 10, wherein a quantity of the third mode is 0.

* * * * *